(12) United States Patent
Hussain et al.

(10) Patent No.: US 8,774,007 B2
(45) Date of Patent: Jul. 8, 2014

(54) APPARATUS AND METHOD FOR DATA COMMUNICATION IN AN ENERGY DISTRIBUTION NETWORK

(75) Inventors: Mohsin Hussain, Campbell, CA (US);
Brock LaPorte, San Carlos, CA (US);
Udo Uebel, San Francisco, CA (US);
Aftab Zia, Campbell, CA (US)

(73) Assignee: Sunpower Corporation, San Jose, CA (US)

( * ) Notice: Subject to any disclaimer, the term of this patent is extended or adjusted under 35 U.S.C. 154(b) by 756 days.

(21) Appl. No.: 13/070,351

(22) Filed: Mar. 23, 2011

(65) Prior Publication Data
US 2012/0243416 A1 Sep. 27, 2012

(51) Int. Cl.
*H04L 12/26* (2006.01)
*G06F 17/00* (2006.01)

(52) U.S. Cl.
USPC ............................................. 370/241; 726/11

(58) Field of Classification Search
USPC ........ 370/241; 726/11; 700/291; 340/870.01, 340/870.02
See application file for complete search history.

(56) References Cited

U.S. PATENT DOCUMENTS

| | | | |
|---|---|---|---|
| 7,508,173 B2 | 3/2009 | Zhou et al. | |
| 2005/0090937 A1 | 4/2005 | Moore et al. | |
| 2009/0205637 A1 | 8/2009 | Moore et al. | |
| 2010/0067271 A1 | 3/2010 | Garces et al. | |
| 2010/0124498 A1 | 5/2010 | Kabatzke et al. | |
| 2011/0040419 A1* | 2/2011 | Kogler et al. | 700/293 |
| 2011/0140080 A1* | 6/2011 | Xiong et al. | 257/13 |
| 2012/0038217 A1* | 2/2012 | Egiziano et al. | 307/82 |
| 2012/0038487 A1* | 2/2012 | Endle et al. | 340/870.03 |
| 2012/0206093 A1* | 8/2012 | Schaefer et al. | 320/107 |
| 2012/0245749 A1* | 9/2012 | Littrell | 700/291 |

OTHER PUBLICATIONS

International Search Report for PCT/US2011/063574 mailed Jul. 25, 2012.

* cited by examiner

*Primary Examiner* — Brian D Nguyen
(74) *Attorney, Agent, or Firm* — Knobbe Martens Olson & Bear LLP (57) ABSTRACT

A system for communicating information on an energy distribution network is disclosed. In one embodiment, the system includes a local supervisor on a communication network, wherein the local supervisor can collect data from one or more energy generation/monitoring devices. The system also includes a command center on the communication network, wherein the command center can generate one or more commands for controlling the one or more energy generation devices. The local supervisor can periodically transmit a data signal indicative of the data to the command center via a first channel of the communication network at a first interval. The local supervisor can also periodically transmit a request for a command to the command center via a second channel of the communication network at a second interval shorter than the first interval. This channel configuration provides effective data communication without a significant increase in the use of network resources.

20 Claims, 9 Drawing Sheets

APPARATUS AND METHOD FOR DATA COMMUNICATION IN AN ENERGY DISTRIBUTION NETWORK

STATEMENT REGARDING FEDERALLY SPONSORED RESEARCH OR DEVELOPMENT

The invention described herein was made with Governmental support under contract number DE-FC36-07G017043 awarded by the United States Department of Energy. The Government may have certain rights in the invention.

BACKGROUND

1. Field

Embodiments of the invention relate to energy distribution networks, and more particularly, to data communication in an energy distribution network.

2. Description of the Related Technology

A conventional electrical network or grid is structured for effectively delivering electricity from remote electricity generation sites (such as power plants) to industrial and domestic consumers. Recently, various technologies have been developed, focusing on reducing wasted electricity over an electrical network while utilizing various clean or renewable energy resources, such as sunlight, wind, water, and geothermal heat. Such technologies typically require supervision (for example, control and monitoring) of energy generation, distribution and consumption by various systems and devices in the electrical network. In addition, there is a need for exchange of information or data amongst the systems and devices in the network to optimize energy generation and distribution, depending on varying conditions.

SUMMARY

In one embodiment, a system for communicating information on an energy distribution network comprises: a first station on a communication network, wherein the first station is configured to collect data from one or more energy generation/monitoring devices; and a second station on the communication network, wherein the second station is configured to generate one or more commands for controlling the one or more energy generation/monitoring devices. The first station is configured to periodically transmit a data signal indicative of the data to the second station via a first channel of the communication network at a first interval. The first station is further configured to periodically transmit a request for a command to the second station via a second channel of the communication network at a second interval shorter than the first interval.

The first station can be configured to initiate all communications with the second station through a firewall. The first station does not periodically transmit the data signal to the second station via the second channel. The first station can be a local supervisor station for an energy generation plant remote from the second station, and the second station can be a central command center system. The first station can be a local photovoltaic (PV) supervisor device at a power generation site.

The second station can be configured to queue two or more commands for transmission in a predetermined order based at least partly on the priorities of the commands. The second station can be further configured to transmit a command prior to the two or more commands if the command has a higher priority than the two or more commands. The second station can be further configured to transmit an additional command, and to invalidate at least one of the two or more commands if the additional command is in conflict with the at least one of the two or more commands. The second station can be further configured to transmit a command to restore the state of the first station to a prior state. The second station can be further configured to repeat transmitting a command to the first station until the second station receives an acknowledgment indicative of execution of the command from the first station.

The first station can be configured to immediately transmit data indicative of an emergency condition of the one or more energy generation devices to the second station via the second channel, in addition to periodically transmitting the data signal via the first channel. The first station can be configured to adaptively vary the second interval based at least partly on one or more of behavior trends of the one or more energy generation devices, condition trends of the system, or the number of commands transmitted via the second channel.

In another embodiment, an apparatus for communicating information on an energy distribution network is provided. The apparatus comprises: a processor configured to collect data from one or more energy generation/monitoring devices over a local area network; and a network adaptor configured to connect to a communication network. The processor is further configured to periodically transmit a data signal indicative of the data to a command center system via a first channel of the communication network at a first interval, using the network adaptor. The processor is further configured to periodically transmit a request for a command to the command center system via a second channel of the communication network at a second interval shorter than the first interval.

In yet another embodiment, a method of communicating data in an energy distribution network comprises periodically transmitting, by a local supervisor station, a data signal to a central command center system via a first channel of a communication network at a first interval. The data signal is indicative of data collected by the local supervisor station from one or more energy generation/monitoring devices. The local supervisor station periodically transmits a request for a command for controlling the one or more energy generation/monitoring devices to the central command center system via a second channel of the communication network at a second interval shorter than the first interval.

In yet another embodiment, a method of communicating data comprises periodically transmitting, by a first station communicating through a firewall, a data signal to a second station via a first channel of a communication network at a first interval, while establishing communication through the firewall. The data signal is indicative of data collected from one or more local devices. The first station periodically transmits a request for a command to the second station via a second channel of the communication network at a second interval shorter than the first interval, while establishing communication through the firewall. The first station receives a command via the second channel of the communication network after transmitting the request for a command, while establishing communication through the firewall.

DETAILED DESCRIPTION OF EMBODIMENTS

The following detailed description of certain embodiments presents various descriptions of specific embodiments of the invention. However, the invention can be embodied in a multitude of different ways as defined and covered by the claims. In this description, reference is made to the drawings where like reference numerals indicate identical or functionally similar elements.

The terminology used in the description presented herein is not intended to be interpreted in any limited or restrictive manner, simply because it is being utilized in conjunction with a detailed description of certain specific embodiments of the invention. Furthermore, embodiments of the invention may include multiple novel features, no single one of which is essential.

Overview of Energy Distribution System

Figure 1:
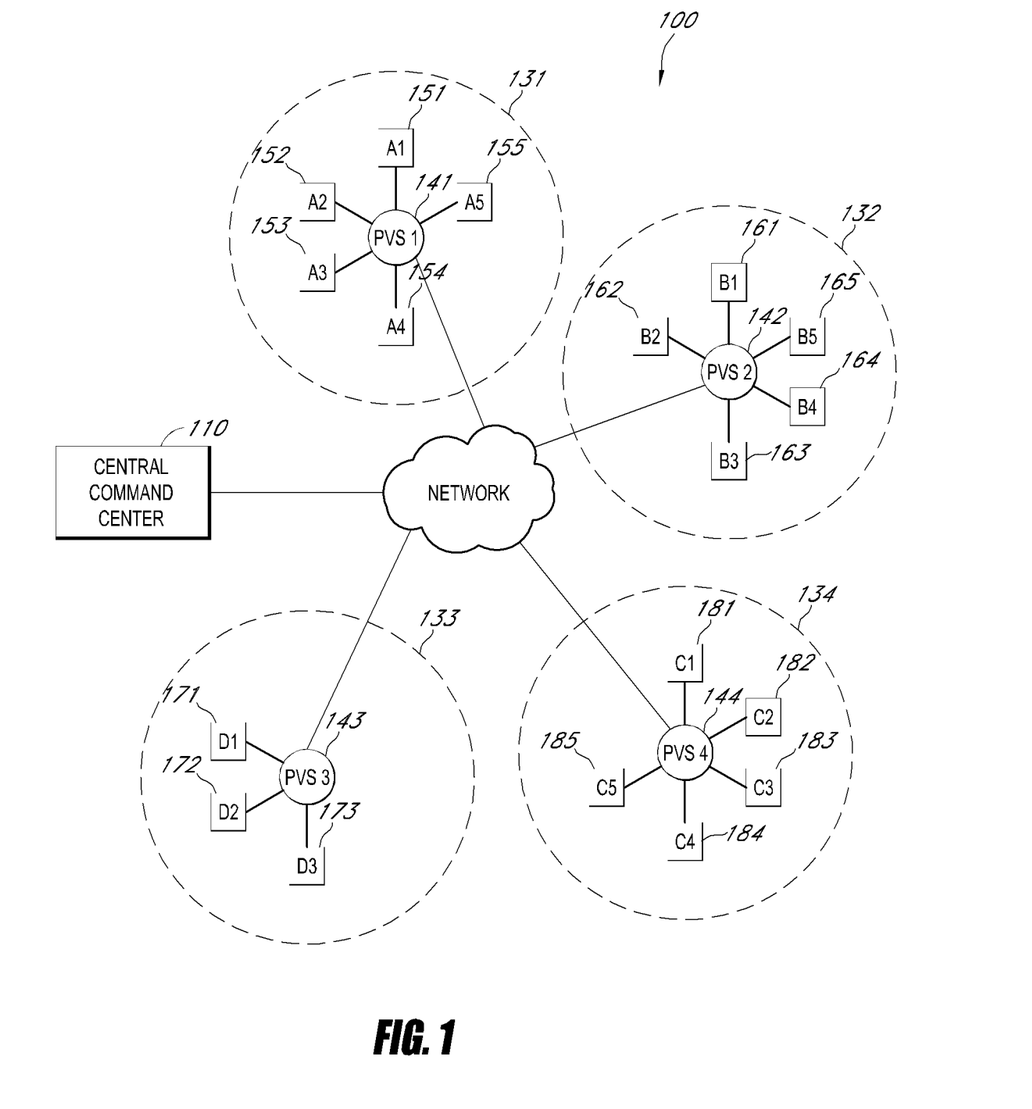
FIG. 1 is a schematic block diagram of a conventional energy distribution network.

Referring to FIG. 1, a conventional energy distribution network will be described below. The illustrated energy distribution network 100 includes a central command center 110, a communication network 120, and a plurality of energy generation/monitoring systems 131-134. For the sake of illustration, the energy distribution network 100 is shown to have four energy generation/monitoring systems, but a skilled artisan will appreciate that the number of energy generation/monitoring systems can vary widely from one to hundreds or thousands.

Figure 2A:
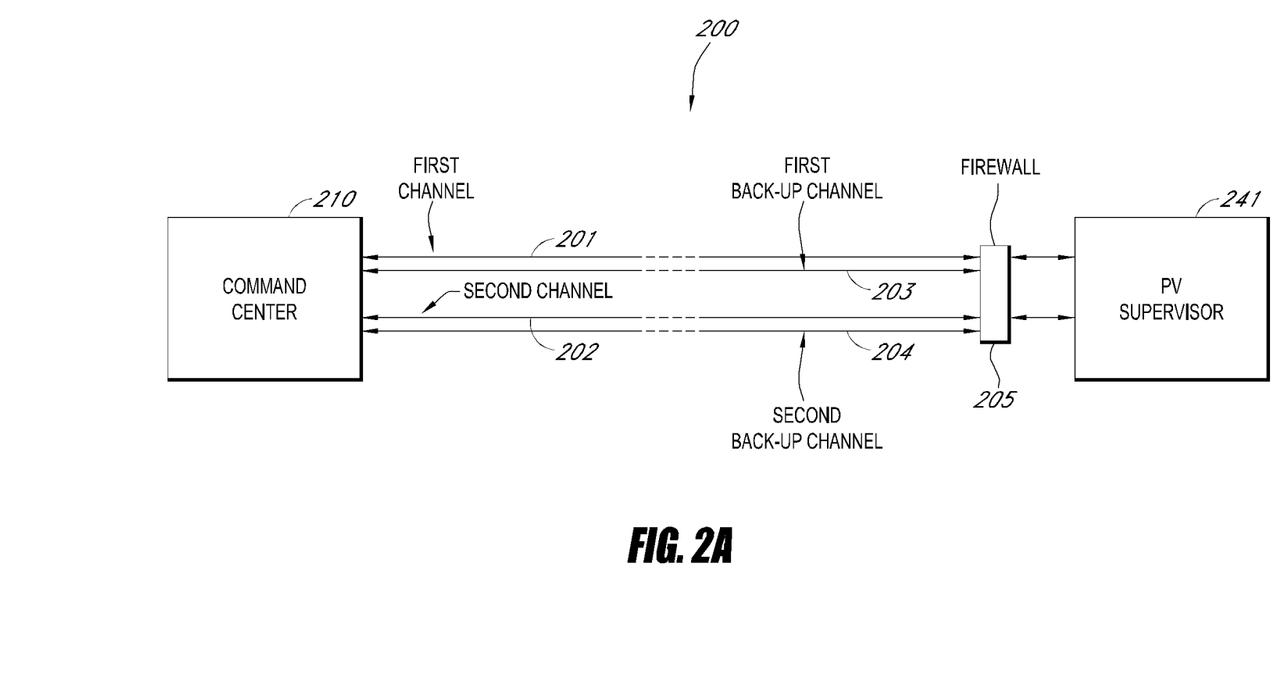
FIG. 2A is a schematic block diagram of an energy distribution system including a command center and a photovoltaic (PV) supervisor according to one embodiment.

The central command center 110 serves to collect data from first to fourth energy generation/monitoring systems 131-134. The central command center device 110 can also serve to provide commands to the first to fourth energy generation/monitoring systems 131-134 to control the systems 131-134, based at least partly on the collected data or certain emergency conditions (for example, a failure at one of the systems 131-134 or a portion of the distribution network 100). The central command center 110 can include a single command center device. Alternatively, the central command center 110 can include two or more command center devices that form a command center system. Such command center devices can be connected to one another via the network 120 in some implementations. In the context of this document, a single command center device and a command center system can be collectively referred to as a "command center" or "central command center." Other details of the central command center 110 will be described in connection with FIG. 2.

The communication network 120 serves to provide communication paths between the command center 110 and the first to fourth energy generation/monitoring systems 131-134, and between two of the first to fourth energy generation/monitoring systems 131-134. Examples of the communication network 120 include, but are not limited to, one or a combination of the Internet, a local area network (LAN), a wide area network (WAN), a telephone network, and a virtual private network (VPN). In certain embodiments, at least part of the communication network 120 can be formed by a wireless network.

Each of the first to fourth energy generation/monitoring systems 131-134 serves to generate energy and/or monitor use of energy. In the context of this document, the term "energy generation/monitoring system or device" collectively refers to a system or device that generates energy or electricity and/or monitors use of energy or electricity. For example, each of the first to fourth energy generation/monitoring systems 131-134 can include a photovoltaic (PV) supervisor computing device or station 141-144, for the example in which the energy generation/monitoring systems 131-134 are solar power plants or farms. In the context of this document, the term "photovoltaic supervisor computing device or station" can be referred to as "PV supervisor." In another embodiment in which an energy generation/monitoring system generates power using a resource (for example, wind) other than solar radiation, the energy generation/monitoring system can include a local energy generation/monitoring supervisor, instead of a PV supervisor. A PV supervisor or local energy generation/monitoring supervisor can be located remotely from the central command center 110. In one embodiment, a distance between the PV supervisor or local energy generation/monitoring supervisor and the central command center 110 can be at least in the order of meters to kilometers.

Each of the first to fourth energy generation/monitoring systems 131-134 can also include various energy generation/monitoring devices 151-155, 161-165, 171-173, 181-185 for energy generation and/or monitoring. Examples of energy generation/monitoring devices include, but are not limited to, a solar or photovoltaic (PV) panel, a solar or PV inverter, a wind power generator, an energy storage device, an energy use monitor or sensor (such as an electricity meter), a meteorology sensor (for one or more of wind speed, wind direction, humidity, ambient air temperature, cell temperature, back of module temperature, precipitation, and irradiance (plane of array and global)), a building automation sensor, a smart meter, and a home automation sensor (for example, a smart thermostat). A skilled artisan will appreciate that energy generation/monitoring devices can include any device useful for monitoring and optimizing power generation, e.g., adjusting panel positions, turning on or off certain blocks or strings of energy generation devices.

Each of the first to fourth energy generation/monitoring systems 131-134 can include only energy generation devices (such as solar inverters), only energy monitoring devices (such as electricity meters), or a combination of energy generation devices and energy monitoring devices. The energy generation/monitoring devices 151-155, 161-165, 171-173, 181-185 can communicate data and/or control signals with the PV supervisor 141-144 within the energy generation/monitoring system 131-134 via a wired and/or wireless communication sub-network, for example, a local area network (LAN).

The PV supervisor 141-144 and the devices 151-155, 161-165, 171-173, 181-185 within each of the first to fourth energy generation/monitoring systems 131-134 can be located geographically proximate to one another. For example, the supervisor 141 and energy generation/monitoring devices 151-155 can be located on a solar plant site or solar farm.

During operation, the energy generation/monitoring devices 151-155, 161-165, 171-173, 181-185 provide raw data or information on energy generation and/or energy monitoring to the PV supervisor 141-144 within each energy generation/monitoring system 131-134. The PV supervisors 141-144 can process the raw data or information to generate data or information to be sent to the command center 110. The PV supervisors 141-144 can send the processed data or information via the communication network 120 to the command center 110 according to a selected protocol of the energy distribution network 100. The PV supervisors 141-144 can also transmit control signals to the energy generation/monitoring devices 151-155, 161-165, 171-173, 181-185 within their energy generation/monitoring systems 131-134, and handle responses from the devices.

The command center 110 can collect the data or information from the PV supervisors 141-144. The command center 110 can also determine whether there is a need for sending one or more of the PV supervisors 141-144 one or more commands, based at least partly on the collected data or information in order to control or adjust the operations of one or more of the systems 131-134. If there is such a need, the command center 110 sends one or more commands to the appropriate PV supervisor(s) 141-144 via the communication network 120.

In an energy distribution network 100, the PV supervisors 141-144 periodically transmit data or information to the command center 110 at a selected time interval, for example, every five to fifteen minutes. Each of the PV supervisors 141-144 can be provided with a firewall for the security of the PV supervisor 141-144. While the PV supervisors 141-144 transmit data or information to the command center 110, the firewalls are temporarily opened or disabled for data exchange. While the firewalls are opened, the command center 110 can also send commands to the PV supervisors 141-144, if needed.

The time interval of the data/command transmission is selected to efficiently utilize the limited bandwidth of channels in the network 120 for exchanging a large amount of data (and optionally commands) between the command center 110 and the PV supervisors 141-144. However, the interval between data/command transmissions may be too long if there is a need for an immediate action or response by the systems 131-134 within a period of time shorter than the interval between exchanges.

A dedicated connection that is always available between the command center 110 and the PV supervisors 141-144 is one option for enabling quicker command transmission. However, such a dedicated connection can be expensive in terms of network resources, and does not scale up well as the number of energy generation/monitoring systems increases. Therefore, there is a need for a scheme that can provide effective exchange of commands between the command center 110 and the PV supervisors 141-144 at a shorter interval than normally scheduled data transmissions to the central command center 110 with no significant increase in the use of network resources while allowing easy scale up of the network 100.

Energy Distribution System with Dual Channel Communication

In one embodiment, an energy distribution network can use a communication network to exchange data or information among devices and/or systems within the energy distribution network. The energy distribution network can include a command center and one or more energy generation/monitoring systems on the communication network. Each of the energy generation/monitoring systems can include a local supervisor device or station, and one or more energy generation/monitoring devices. The supervisor device can collect data from the energy generation/monitoring devices within the energy generation/monitoring system, and controls the operations of the energy generation/monitoring devices. The command center can generate one or more commands for controlling or adjusting the operations of the energy generation/monitoring systems.

The supervisor device can periodically transmit a data signal indicative of the collected data to the command center via a first channel of the communication network at a first interval. The supervisor device can also periodically transmit a request for a command to the command center via a second channel of the communication network at a second interval shorter than the first interval. The command center can transmit commands to the supervisor device upon receiving a request for a command. By using a dual channel configuration, the energy distribution network can effectively control energy generation/monitoring systems when there is an urgent need that may not be addressed soon enough by using only the first channel after the first interval. Furthermore, the configuration does not significantly increase the use of limited network resources while allowing easy scale up of the system.

Figures 2B, 2C:
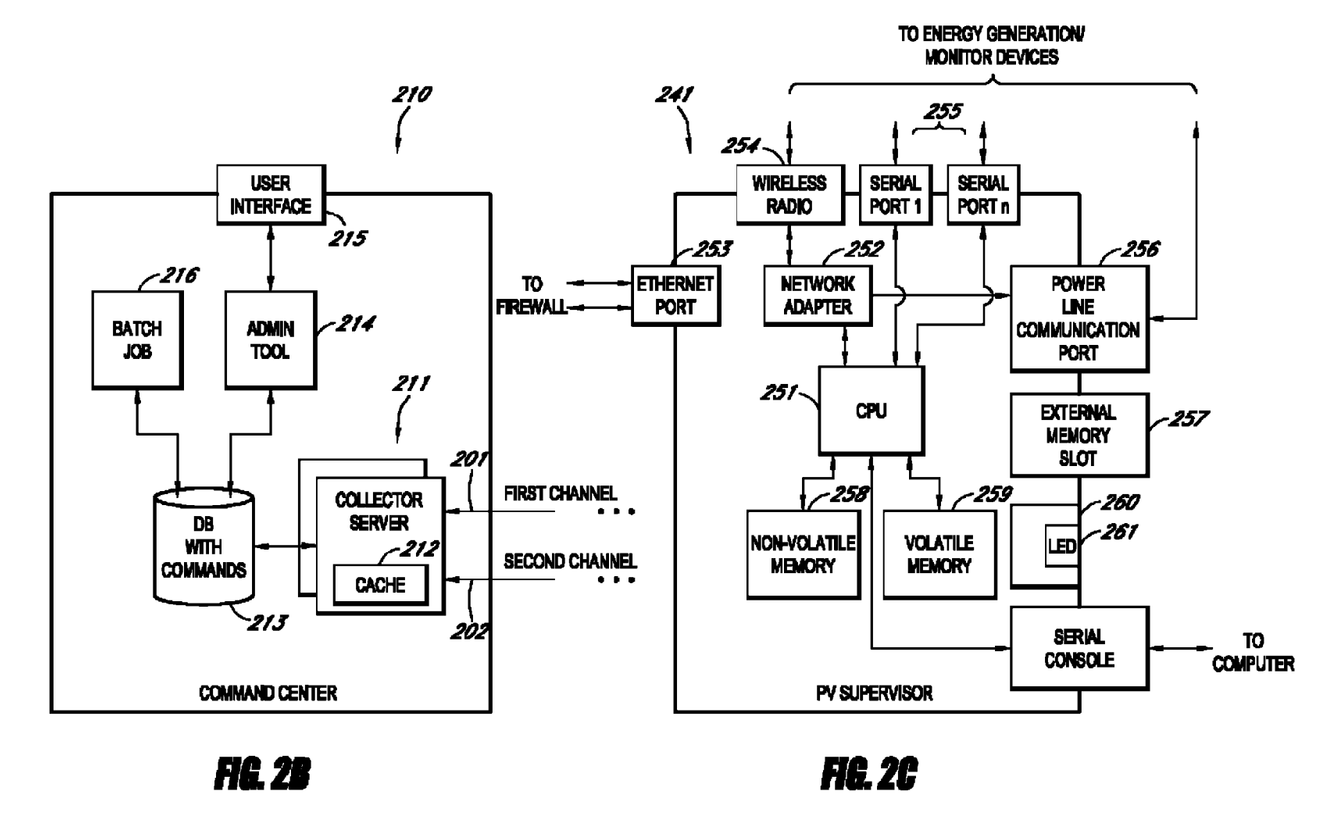
FIG. 2B is a schematic block diagram of a command center according to one embodiment.
FIG. 2C is a schematic block diagram of a PV supervisor according to one embodiment.

Referring to FIGS. 2A-2C, an energy distribution system according to one embodiment will be described below. FIG. 2A shows a portion of an energy distribution system 200 that includes a command center 210, a firewall 205, and a PV supervisor 241. The energy distribution system 200 can include a plurality of PV supervisors, as described above in connection with FIG. 1, although FIG. 2A shows a single PV supervisor. In one embodiment, a single supervisor can supervise multiple energy generation/monitoring devices. In other embodiments, a plurality of supervisors can be together configured to supervise multiple energy generation/monitoring devices.

The command center 210 and the PV supervisor 241 can communicate with each other over a communication network, such as the network 120 of FIG. 1. The command center 210 and the PV supervisor 241 can use a first channel 201 and a second channel 202 to exchange data and/or commands therebetween over the network. In the context of this document, the first channel 201 can also be referred to as a "data channel," and the second channel 202 can also be referred to as a "control channel."

In the context of this document, the term "channel" refers to a logical communication path established between two devices or systems over a communication network. For example, if the communication network is the Internet, a channel can be established between two devices, using an application level protocol, such as Hypertext Transfer Protocol (HTTP) or Hypertext Transfer Protocol Secure (HTTPS). In another embodiment, a channel can be established between two devices, using a serial communication protocol. In other embodiments, a channel can be established between two devices, using a Transmission Control Protocol/Internet Protocol (TCP/IP) port. In such an implementation, two different channels can be established using two different TCP/IP ports. In some embodiments, the command center 210 and the PV supervisor 241 can be optionally provided with a first back-up channel 203, and/or a second back-up channel 204 in case one or more of the first and second channels 201, 202 does not function as desired.

Referring to FIG. 2B, details of a command center according to one embodiment will be described below. The illustrated command center 210 includes one or more collector servers 211, a database 213, an administration tool 214, a user interface 215, and a batch job processor 216. The foregoing components of the command center 210 can be implemented in firmware and/or software in a memory device.

The collector servers 211 serve to exchange data and/or commands with one or more PV supervisors via the first and second channels 201, 202, and temporarily store data and/or commands in caches 212. The collector servers 211 can also provide the cached data to the database 213 to permanently store the data.

The collector servers 211 can also temporarily store commands from the database 213 in the caches 212 before transmitting the commands via either of the channels 201, 202. By storing commands temporarily in the caches 212, a need to poll the database 213 in real time upon receiving a request for a command is reduced during operation, which will be described in detail in connection with FIGS. 3, 4A, and 4B. In some embodiments, commands are purged from all the collector servers 211 once the commands have been successfully transmitted, depending on the configurations of the collector servers 211. For example, commands can be partitioned for certain devices per collector server, for example, by sticky load balancing or round robin load balancing, and at least a portion of commands that have been transmitted can be purged from the collector servers 211.

The database 213 can store data provided from the collector servers 211. The database 213 can also store various commands for controlling the operations of the energy generation/monitoring systems. Examples of commands are listed in Table 1 below. A skilled artisan will appreciate that the commands that can be used in the system 200 (FIG. 2A) are not limited to those illustrative examples listed in Table 1.

sors within the energy distribution system, the batch job processor 216 can process the data, and automatically make decisions on whether to take any action, based at least partly on the processed data. If the batch job processor 216 decides to take an action, it can select one or more commands from the database 213, and send the commands to the collector servers 211 for transmission.

The collector servers 211 can temporarily store the selected commands in the caches 212 until they can use either of the channels 201, 202 for transmission. In one embodiment, when the second channel 202 is available, the collector servers 211 can transmit the commands to one or more PV supervisors, according to a selected protocol. In another embodiment, the collector servers 211 can transmit the commands via either the first or second channel 201, 202, depending on the type and/or size of the commands. For example, the collector servers 211 can transmit a command for firmware updates via the first channel 201, which can be configured for heavier traffic than the second channel 202.

Referring to FIG. 2C, a PV supervisor according to one embodiment will be described below. In the illustrated embodiment, the PV supervisor 241 includes a central processing unit (CPU) 251, a network adaptor 252, an Ethernet port 253, a wireless radio 254, one or more serial ports 255, a power line communication port 256, an external memory slot 257, a non-volatile memory 258, a volatile memory 259, a user interface 260, and a serial console 262. A skilled artisan will appreciate that the PV supervisor can include any other suitable components, depending on the needs and configuration of the PV supervisor 241.

The CPU 251 serves to process various data and commands and to control operations of the PV supervisor 241. The CPU 251 can process raw data from various energy generation/monitoring devices within the energy generation/monitoring system with which the PV supervisor 241 is associated.

TABLE 1

| Category | Commands |
| --- | --- |
| Commands for PV Supervisor Configuration or operating instruction | Set data transmission interval for channel 1<br>Upgrade firmware<br>Open Secure Shell (SSH) tunnel<br>Run device discovery and update device list |
| Commands for control of command channel | Listen for commands at a faster/slower rate for channel 2 |
| Commands for handling data collection | Poll devices at a faster rate<br>Erase all buffered data<br>Cancel Buffered Data Transmission |
| Commands for Remote Device configuration and/or operating instructions | Change a Current Transducer (CT) scaling factor on a meter<br>Change a calibration value on a meteorology (MET) sensor<br>Change setpoint on inverter<br>Change operating mode of an inverter<br>Change attributes of an operating mode for an inverter |
| Commands to control system level behavior | Set a system level ramp rate set point that PV supervisor orchestrates across devices<br>Set a system level power factor |

The user interface 215 serves to receive an input from a user such that the user can manually control the command center 210 through the administration tool 214. The administration tool 214 allows the user to access the commands in the database 213, and to use the commands, if desired, to control one or more of the energy generation/monitoring systems, such as the systems 131-134 of FIG. 1.

The batch job processor 216 serves to provide automated processing of data collected from the energy generation/monitoring systems. Upon collecting data from PV supervi- Energy generation/monitoring devices within an energy generation/monitoring system can be referred to as a "local" energy generation/monitoring devices in the context of this document.

The network adaptor 252 serves to convert processed data from the CPU 251 into an appropriate form for communication (e.g., via the Ethernet port 253) over a network, such as the network 120 of FIG. 1. The network adaptor 252 can also serve to convert a command (via the Ethernet port 253) from the command center 210 into an appropriate form for processing by the CPU 251. The network adaptor 252 can also include a cellular modem.

The CPU 251 can receive raw data from local energy generation/monitoring devices via one or more of the wireless radio 251, the serial ports 255, or the power line communication port 256. The wireless radio 254 can be any suitable wireless radio transceiver in compliance with, for example, IEEE 802.11 (such as WiFi®) or IEEE 802.15 (such as Zig-Bee®). The serial ports 255 can be, for example, USB ports. The power line communication (PLC) port 256 can be any suitable power line communication port.

The external memory slot 257 can serve to receive any suitable external memory, such as a Secure Digital (SD) card. The non-volatile memory 258 can be, for example, a flash memory or a hard disk drive. The volatile memory 259 can be, for example, one or more dynamic random access memories (DRAMs).

The user interface 260 serves to provide an interface between the PV supervisor 241 and a user. The user interface 260 can include one or more of a keyboard, a key pad, key buttons, a touch screen, or an LCD or CRT display. The user interface 260 can include light emitting diodes (LEDs) 261 to indicate various operation states of the PV supervisor 241. The serial console 262 serves to provide an interface between the PV supervisor 241 and a general purpose computer (not shown) to control the PV supervisor 241. Although not illustrated, the PV supervisor 241 can also include a power supply and analog interfaces for measuring voltage/current.

Figure 3:
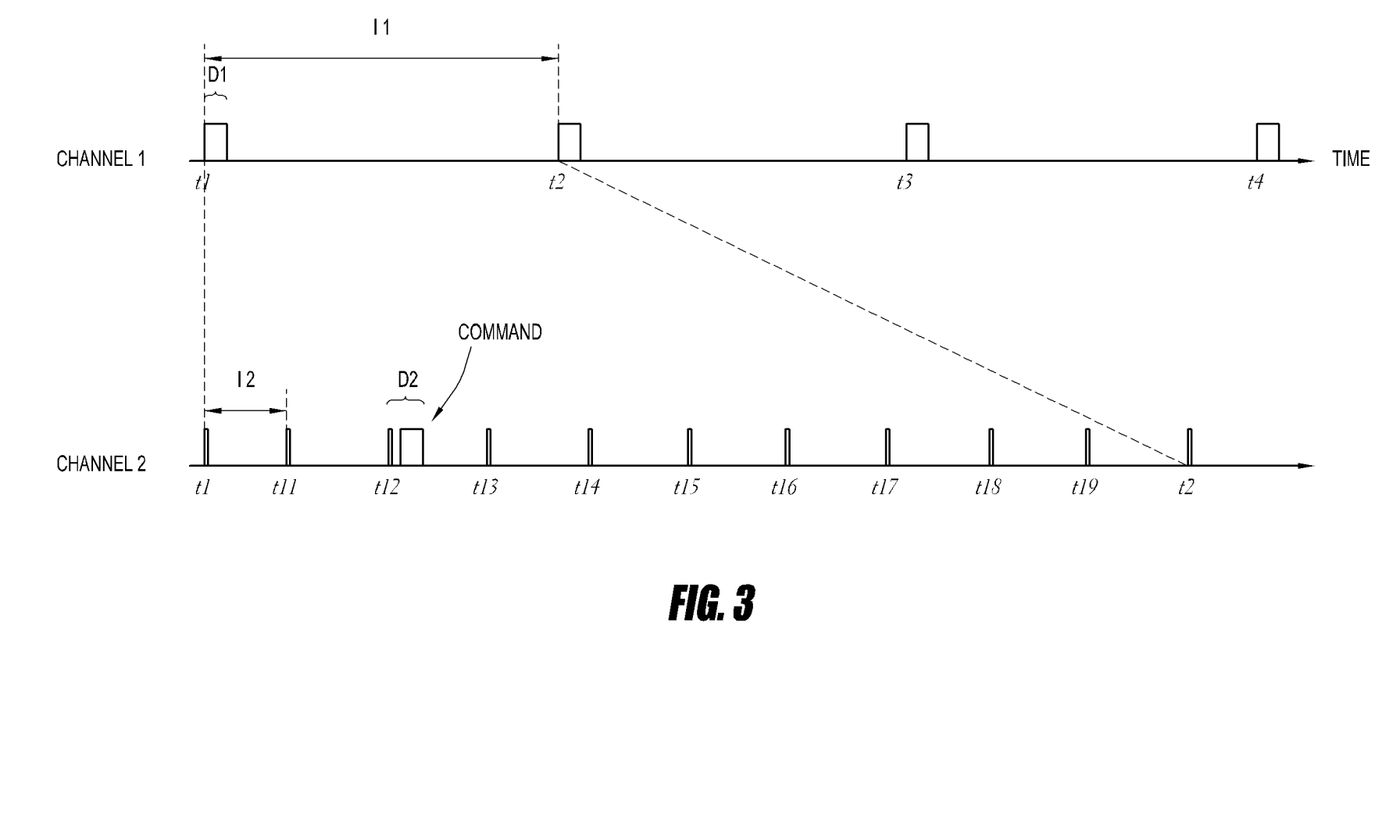
FIG. 3 is a timing diagram illustrating a method of communication between a command center and a PV supervisor according to one embodiment.

Referring to FIGS. 2A, 3, 4A and 4B, a method of communication between a PV supervisor and a command center according to one embodiment will be described below. FIG. 3 is a timing diagram illustrating data and/or command exchange between a PV supervisor and a command center over first and second channels, such as the first and second channels 201, 202 of FIG. 2A.

As shown in FIG. 3, the PV supervisor 241 can periodically transmit data to the command center 210 over the first channel 201 at a first interval I1. The first interval I1 can be, for example, between about 5 minutes and 15 minutes, depending upon the network resources and the number of PV supervisors within the energy distribution network. For example, the PV supervisor 241 can transmit data beginning at points of time t1, t2, t3, and t4 in the FIG. 3. The transmission by the PV supervisor can be conducted within a first duration D1 during which the firewall 205 (FIG. 2A) is open specifically for such transmission. In one embodiment, the average size of periodic transmission on the first channel 201 can be between about 100 bytes and about 5 kilobytes.

Figure 4A:
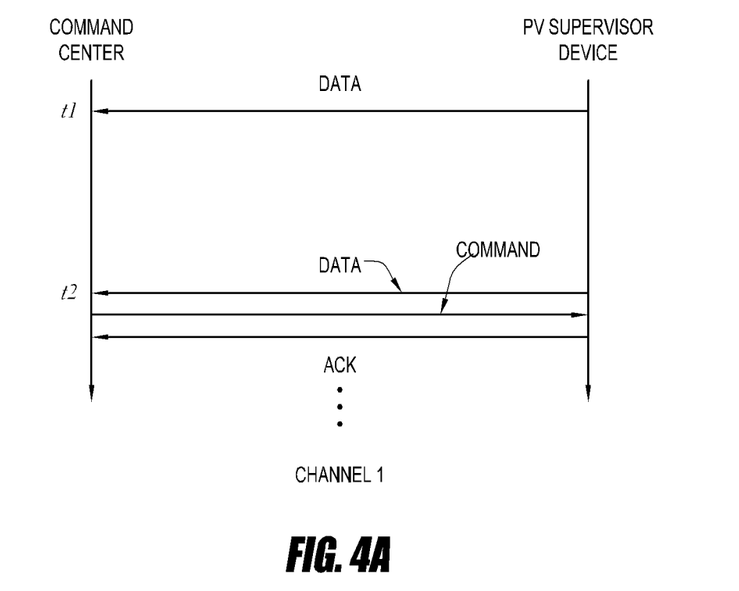
FIGS. 4A and 4B are timing diagrams illustrating a method of data and command exchange between the command center and the PV supervisor in accordance with the periods.

In one embodiment, the first channel 201 is dedicated to data transmission from the PV supervisor 241 to the command center 210. In another embodiment, the first channel 201 can also be used for transmission of certain commands from the command center 210 to the PV supervisor 241. Such commands can be chosen and transmitted based at least partly upon data collected by the command center 210 from one or more PV supervisors over the first channel 201, as shown in FIG. 4A. In such an embodiment, the PV supervisor 241 can send an acknowledgement (ACK) to the command center 210 upon receiving a command from the command center 210. In some embodiments, the processor of the PV supervisor 241 does not periodically transmit data signals to the command center 210 via the second channel 202. In other embodiments, all communications between the PV supervisor 241 and the command center 210 can be initiated by the PV supervisor 241.

Referring back to FIG. 3, the PV supervisor 241 can periodically transmit a request for a command to the command center 210 over the second channel 201 at a second interval I2 that is shorter than the first interval I1. The second interval I2 can be, for example, between about 0.01 seconds and 299 seconds, depending upon, for example, the network resources and the number of PV supervisors within the energy distribution network. For example, the PV supervisor 241 transmits the request beginning at points of time t1, t11, t12, t13, . . . , t19, and t2, as shown in FIG. 3.

The transmission by the PV supervisor 241 can be performed within a second duration D2 during which the firewall 205 (FIG. 2A) is open for such transmission. In one embodiment, the average size of periodic transmission on the second channel 202 can be between about 50 bytes and about 250 bytes. A ratio of the average transmission size on the second channel 202 to the average transmission size on the first channel 201 can range between about 0.01 and about 1,000.

In certain embodiments, the PV supervisor 241 can adaptively vary the second interval I2, based at least partly on one or more of behavior trends of the one or more energy generation/monitoring devices, condition trends of the energy distribution system, or the number of commands transmitted via the second channel 202. For example, if a PV supervisor observes variations in power quality, voltage thresholds being approached, or other PV system or grid variability, the second interval I2 of the second channel 202 can be reduced (i.e., frequency of checks for commands increased) in anticipation of an increase in the number or likelihood of commands transmitted over the second channel 202. In other instances, the second interval I2 of the second channel 202 can be increased (i.e., frequency of checks for commands reduced) if the system is in a stable condition to reduce use of network resources, data communication load, and/or costs.

Figure 4B:
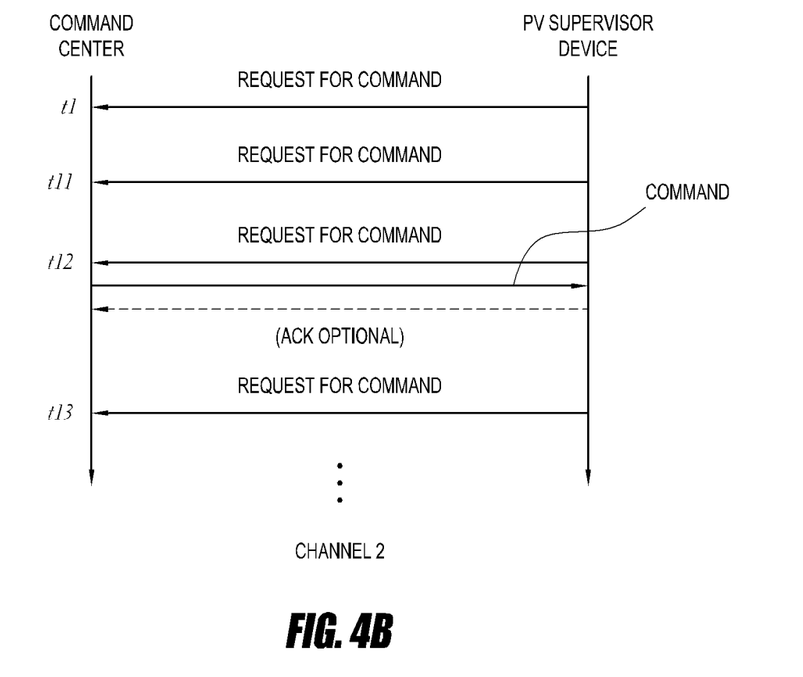

Referring now to FIG. 4B, the PV supervisor 241 can periodically transmit a request for a command to the command center 210 on the second channel 202 (FIG. 2A). The PV supervisor 241 may not receive any command from the command center 210 in response to the request. If there is a command that needs to be sent from the command center 210, the command can be transmitted to the PV supervisor 241 in response to the request during duration that the firewall is open. For example, in FIG. 4B, a request for a command is transmitted from the PV supervisor 241 to the command center 210 at time t12, and a command is transmitted from the command center 210 to the PV supervisor 241 during the second duration D2 from time t12. In some embodiments, the command will have been stored in the cache 212 (FIG. 2B) of the command center 210 such that the command can be transmitted immediately after the command center 210 receives a request from the PV supervisor 241, as described above in connection with FIG. 2B. In the illustrated example, the command may have been cached between time t11 and time t12.

The PV supervisor 241 can optionally send an acknowledgement (ACK) indicative of the receipt or execution of a command to the command center 210 after receiving or executing the command from the command center 210. In some embodiments, the command center 210 can repeat transmitting a command to the PV supervisor 241 until the command center 210 receives an ACK indicative of execution of the command from the PV supervisor 241. As the PV supervisor 241 controls the firewall 205, such acknowledgement can be sent at any time, or can await a subsequent scheduled opening of the firewall 205 (e.g., at time t13).

In one embodiment, commands transmitted over the second channel 202 can be those that require immediate action by the PV supervisor 241 and may not be promptly addressed by regular data and command exchange over the first channel 201 at the first interval. For example, when there is an abrupt increase in power use over the energy distribution network, the command center 210 can transmit a command that requests shut-off of a certain energy use system, or a command that requests an increase in energy generation. Because the PV supervisor 241 opens the firewall more frequently on the second channel 202, the command center 210 has a sooner opportunity to transmit the command over the second channel 202.

In another embodiment, if a fault or other critical condition at an energy generation/monitoring system is detected by the PV supervisor 241, the second channel 202 can be used for transmitting information on the fault or condition from the PV supervisor 241 to the command center 210. For example, if an inverter is detected to be in a fault or other emergency state which requires an immediate action by other energy generation/monitoring systems, the second channel 202 can be activated immediately by the PV supervisor 241 for transmitting status data to the command center 210.

In yet another embodiment, the second channel 202 can be used for transmitting information on broader system conditions. For example, if voltage on a distribution circuit is detected by the PV supervisor 241 to be approaching a threshold, the second channel 202 can be activated immediately for transmitting status data to the command center 210.

Transmission and Execution of Multiple Commands

In some instances, the command center 210 can have two or more commands to be transmitted over either the first channel 201 and/or second channel 202. In one embodiment, the command center 210 can queue such commands in an order (sequence), based at least partly on the priorities of the commands, and transmit the commands in the order.

Figure 5A:
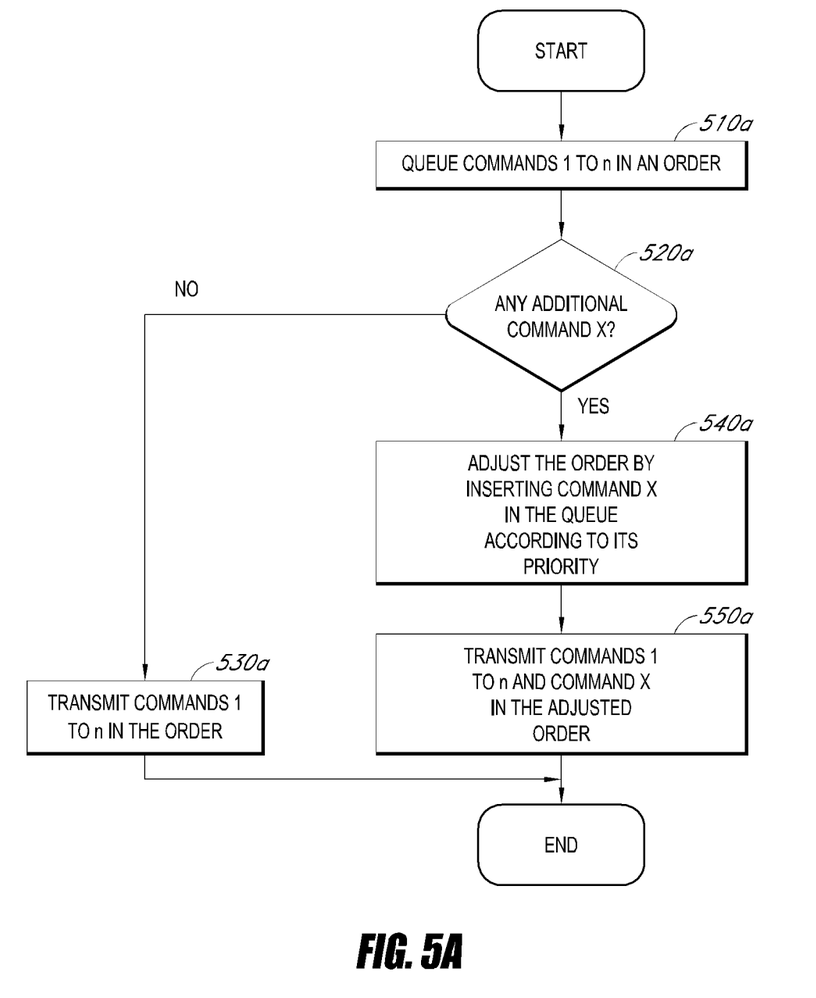
FIG. 5A is a flowchart illustrating a method of transmitting commands by a command center according to one embodiment.

If, however, there is an additional command that needs to be transmitted after the commands have been queued, the command center 210 can process it according to one embodiment, as illustrated in FIG. 5A. Referring to FIG. 5A, the command center 210 can queue Commands 1 to n in an order, based at least partly on the priorities of the commands at block 510a. n is an integer equal to or greater than 2. At block 520a, the command center 210 can determine whether there is any additional command, for example, Command X that has a priority higher than any of the Commands 1 to n. If the answer is NO, the process proceeds to block 530a in which the Commands 1 to n are transmitted in the order, with Command X simply added to the end of the queue without resequencing.

If the answer is YES at block 520a, the command center 210 can insert the Command X in the queue of the Commands 1 to n, based on its priority at block 540a, thereby generating an adjusted order. Subsequently, the command center 210 can transmit the Commands 1 to n and Command X in the adjusted order at block 550a. Priorities or rankings for commands can be obtained from, e.g., a look-up table.

Figure 5B:
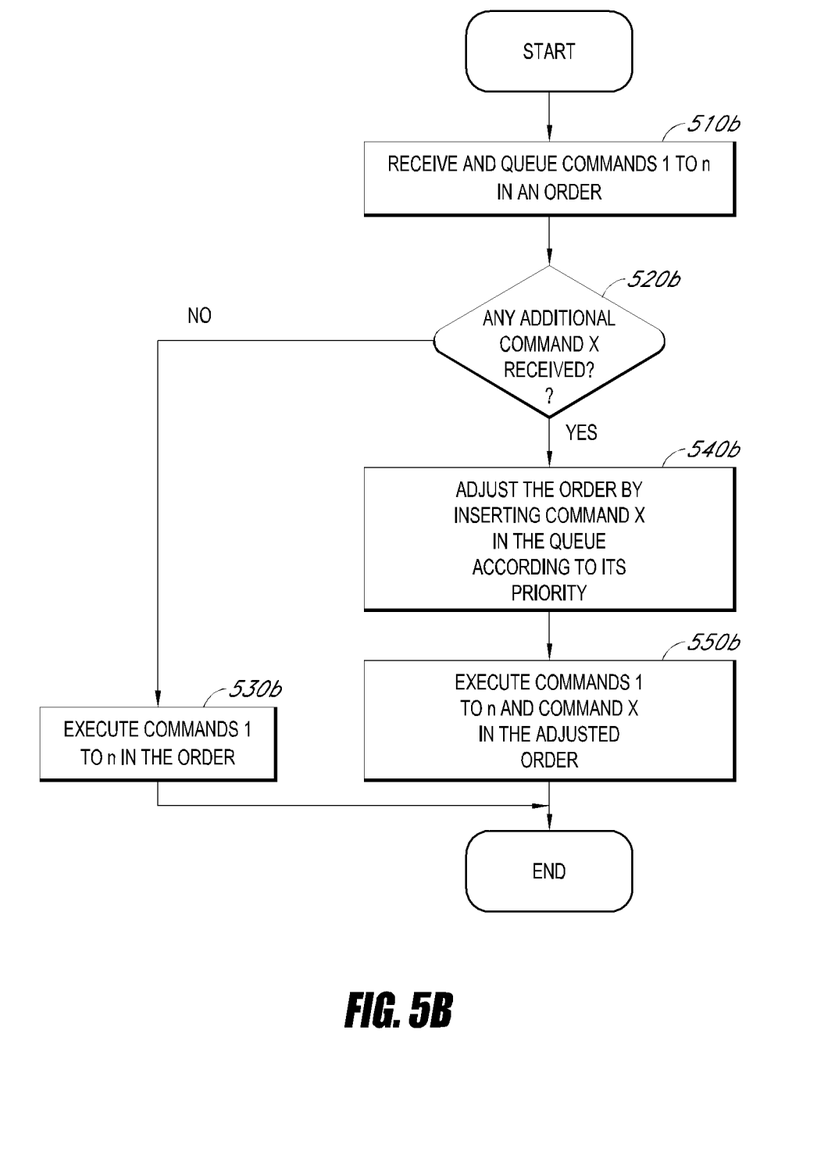
FIG. 5B is a flowchart illustrating a method of executing commands by a PV supervisor device according to one embodiment.

Referring to FIG. 5B, a process of executing multiple commands by a PV supervisor device according to another embodiment will be described below. At block 510b, the PV supervisor 241 can receive (e.g., from the command center 210) and queue Commands 1 to n in an order (sequence), and subsequently receive Command X if the order has not been adjusted at the command center 210 in the method of FIG. 5A. In such an instance, at block 520b, the PV supervisor 241 can determine whether there is any additional command, for example, Command X that has a priority higher than any of the Commands 1 to n. If the answer is NO, the process proceeds to block 530b in which the Commands 1 to n are executed in the order, with Command X simply added to the end of the queue without resequencing.

If the answer is YES at block 520b, the PV supervisor 241 can insert the Command X in the queue of the Commands 1 to n, based on its priority at block 540b, thereby generating an adjusted order. Subsequently, the PV supervisor 241 can execute the Commands 1 to n and Command X in the adjusted order at block 550b.

Figure 6A:
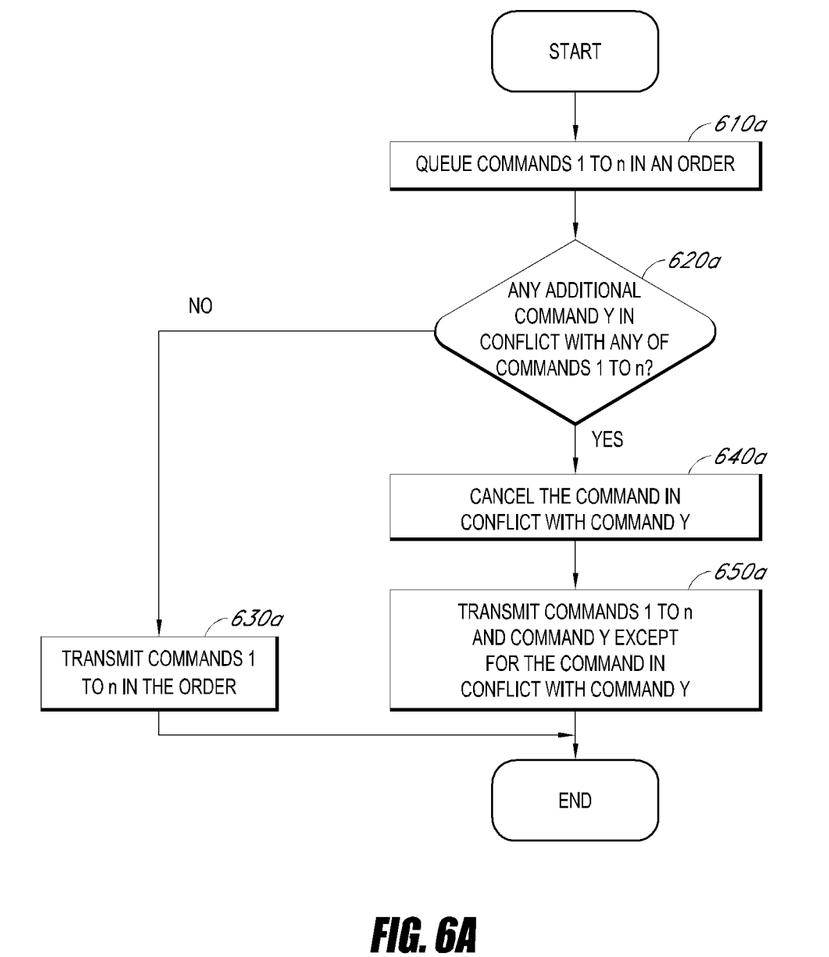
FIG. 6A is a flowchart illustrating a method of transmitting commands by a command center according to another embodiment.

Referring to FIG. 6A, a process of transmitting two or more commands by a command center according to another embodiment will be described below. The command center 210 can queue Commands 1 to n in an order (sequence), based at least partly on the priorities of the commands at block 610a. n is an integer equal to or greater than 2. At block 620a, the command center 210 can determine whether there is any additional command, for example, Command Y that is in conflict with any of the Commands 1 to n. If the answer is NO, the process proceeds to block 630a in which the Commands 1 to n are transmitted in the order. Any non-conflicting Command Y can be fitted into the order or at the end of the queue per, e.g., FIG. 5A.

If the answer is YES at block 620a, the command center 210 can cancel the command in conflict with the Command Y from the queue of the Commands 1 to n, and insert the Command Y based on its priority (see FIG. 5A), thereby generating an adjusted order at block 640a. To cancel the existing command, the command center 210 can check the priorities/rankings of the existing command and the Command Y. In certain instances, the Command Y may be cancelled if the Command Y has a lower priority than the existing command in conflict with the Command Y. Subsequently, the command center 210 can transmit the Commands 1 to n and Command Y in the adjusted order at block 650a, without transmitting the command in conflict with the Command Y.

Figure 6B:
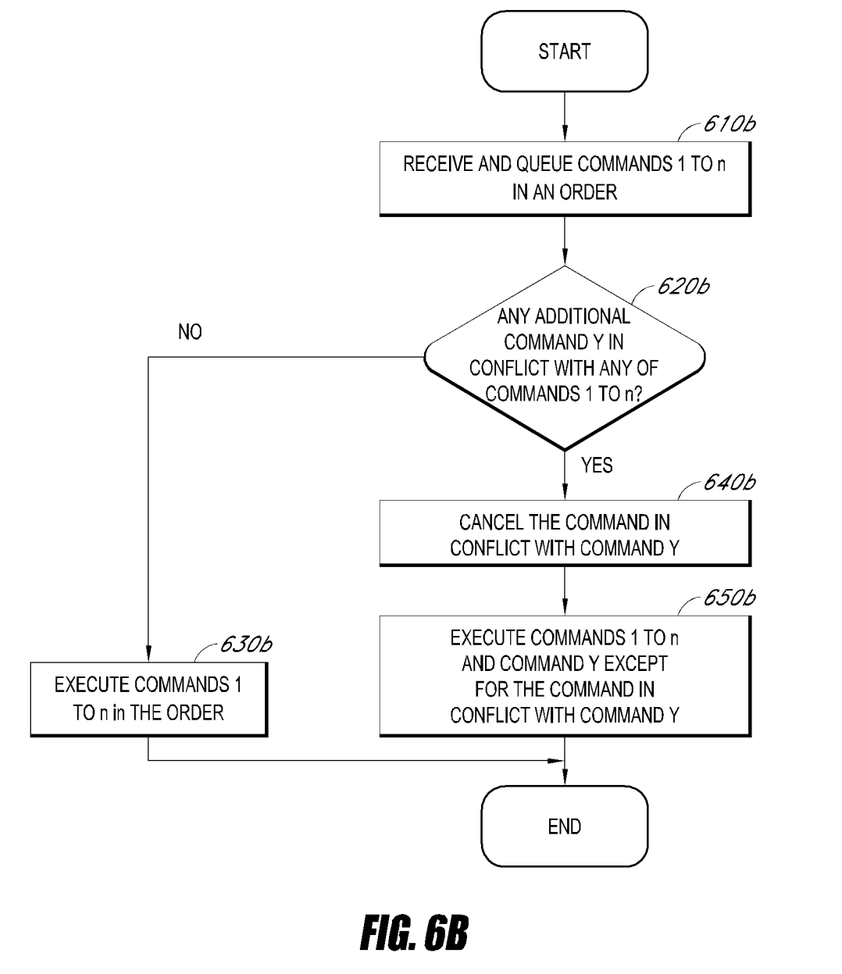
FIG. 6B is a flowchart illustrating a method of executing commands by a PV supervisor device according to another embodiment.

Referring to FIG. 6B, a process of executing multiple commands by a PV supervisor device according to another embodiment will be described below. At block 610b, the PV supervisor 241 can receive and queue Commands 1 to n in an order (sequence), and subsequently receive the Command Y. Assuming no conflicting commands have been cancelled at the command center 210 (FIG. 6B), at block 620b, the PV supervisor 241 can determine whether Command Y is in conflict with any of the Commands 1 to n. If the answer is NO, the process proceeds to block 630b in which the Commands 1 to n are executed in the order. Any non-conflicting Command Y can be fitted into the order on at the end of the queue per, e.g., FIG. 5B.

If the answer is YES at block 620b, the PV supervisor 241 can cancel the command in conflict with the Command Y from the queue of the Commands 1 to n, and insert the Command Y based on its priority (see FIG. 5B), thereby generating an adjusted order at block 640b. To cancel the existing command, the PV supervisor 241 can check the priorities/rankings of the existing command and the Command Y. In certain instances, the Command Y may be cancelled if the Command Y has a lower priority than the existing command in conflict with the Command Y. Subsequently, the PV supervisor 241 can execute the Commands 1 to n and Command Y in the adjusted order at block 650b, without executing the command in conflict with the Command Y.

In another embodiment, the command center 210 can transmit a command to restore the order or queue of commands to be executed by the PV supervisor 241 to a prior state, if needed, after either or both of the methods of FIGS. 5A/5B and 6A/6B is performed.

Applications

The embodiments above are described in the context of an energy distribution system including PV supervisors. In other embodiments, the energy distribution system can include other electricity resources or systems. In such embodiments, the other related or interactive electricity resources or systems can include, for example, a battery controller, a community energy resource controller, distribution automation equipment, a home or building automation system, or detection of ambient environment by automated computer system that have a need to execute commands from the command center.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the Figures depict example arrangements of elements and components, additional intervening elements, devices, features, or components may be present in an actual embodiment.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. An apparatus for communicating information on an energy distribution network, the apparatus comprising:
   a processor configured to collect data from one or more energy generation/monitoring devices over a local area network; and
   a network adaptor configured to connect to a communication network;
   wherein the processor is further configured to periodically transmit a data signal indicative of the data to a command center system via a first channel of the communication network at a first interval, using the network adaptor; and
   wherein the processor is further configured to periodically transmit a request for a command to the command center system via a second channel of the communication network at a second interval shorter than the first interval.

2. The apparatus of claim 1, wherein the processor is configured to initiate all communications with the command center system through a firewall.

3. The apparatus of claim 1, wherein the processor does not periodically transmit the data signal to the command center system via the second channel.

4. The apparatus of claim 1, wherein the apparatus is a local supervisor station for an energy generation plant remote from the command center system.

5. The apparatus of claim 4, wherein the apparatus is a photovoltaic (PV) supervisor device.

6. The apparatus of claim 1, wherein the first interval is between about 5 minutes and about 15 minutes, and wherein the second interval is between about 0.01 seconds and 299 seconds.

7. The apparatus of claim 1, wherein the average size of periodic transmission on the first channel is between about 100 bytes and about 5 kilobytes.

8. The apparatus of claim 1, wherein the average size of periodic transmission on the second channel is between about 50 bytes and about 250 bytes.

9. The apparatus of claim 1, wherein the processor is configured to execute two or more commands received from the command center system in an order received from the command center system.

10. The apparatus of claim 9, wherein the processor is further configured to receive an additional command from the command center system, and to execute the additional command prior to at least one of the two or more commands if the additional command has a higher priority than the at least one of the commands.

11. The apparatus of claim 9, wherein the processor is further configured to receive an additional command from the command center system, and to invalidate at least one of the two or more commands or the additional command if the additional command is in conflict with the at least one of the two or more commands.

12. The apparatus of claim 1, wherein the processor is further configured to restore the state of the apparatus to a prior state upon receiving a command from the command center system.

13. The apparatus of claim 1, wherein the processor is further configured to transmit an acknowledgment indicative of receipt or execution of a command from the command center system.

14. The apparatus of claim 1, wherein the processor is configured to transmit data indicative of an emergency condition of the one or more energy generation/monitoring devices to the command center system via the second channel in addition to periodically transmitting the data signal via the first channel.

15. The apparatus of claim 1, wherein the processor is configured to adaptively vary the second interval based at least partly on one or more of behavior trends of the one or more energy generation/monitoring devices, condition trends of the system, or the number of commands transmitted via the second channel.

16. A method of communicating data in an energy distribution network, the method comprising:
   periodically transmitting, by a local supervisor station, a data signal to a central command center system via a first channel of a communication network at a first interval, the data signal being indicative of data collected by the local supervisor station from one or more energy generation/monitoring devices; and
   periodically transmitting, by the local supervisor station, a request for a command for controlling the one or more energy generation/monitoring devices to the central command center system via a second channel of the communication network at a second interval shorter than the first interval.

17. The method of claim 16, further comprising receiving, by the local supervisor station, a command from the central command center system via the second channel after transmitting the request.

18. The method of claim 16, wherein all communications between the local supervisor station and central command center system are initiated by the local supervisor station.

19. A method of communicating data, the method comprising:
   periodically transmitting, by a first station communicating through a firewall, a data signal to a second station via a first channel of a communication network at a first interval, while establishing communication through the firewall, the data signal being indicative of data collected from one or more local devices; and
   periodically transmitting, by the first station, a request for a command to the second station via a second channel of the communication network at a second interval shorter than the first interval, while establishing communication through the firewall; and receiving, by the first station, a command via the second channel of the communication network after transmitting the request for a command while establishing communication through the firewall.

20. The method of claim 19, wherein the one or more local devices comprise energy generation/monitoring devices.

\* \* \* \* \*